Dec. 7, 1948.     H. HARRISON     2,455,763
INTERFEROMETRIC LIGHT VALVE
Filed March 31, 1945                                2 Sheets—Sheet 1
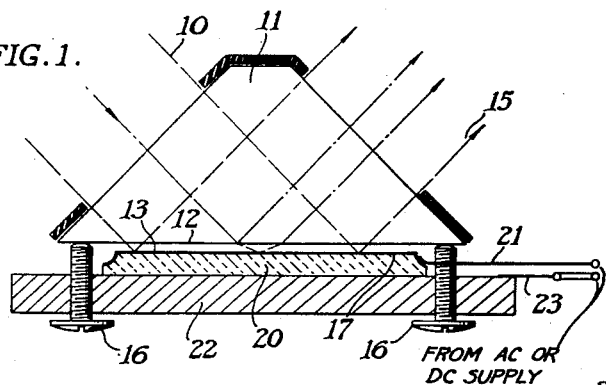
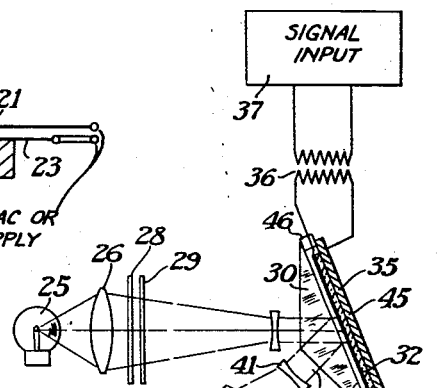
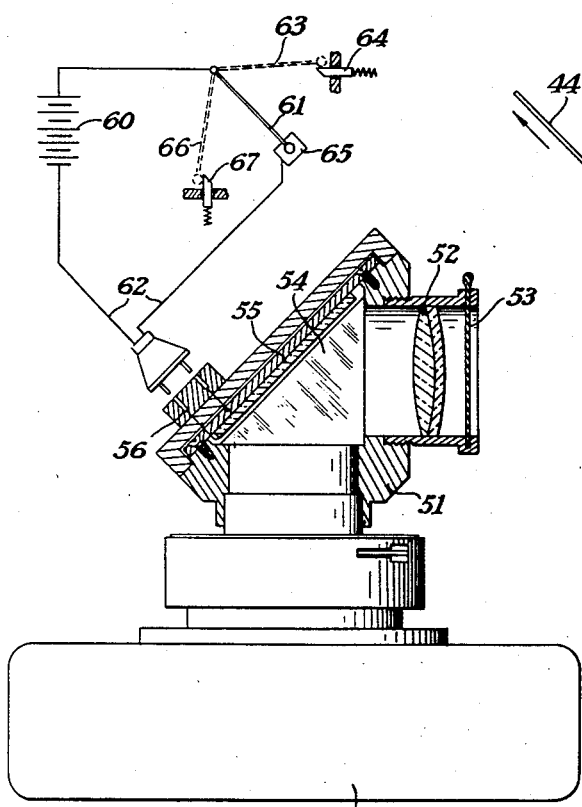
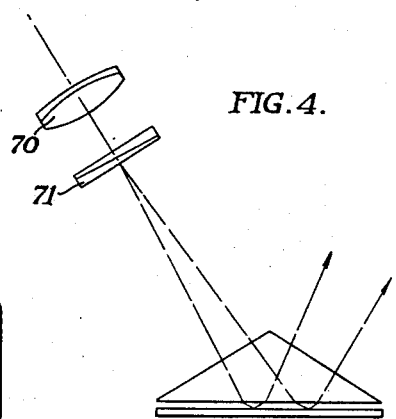
HENRY HARRISON
INVENTOR Dec. 7, 1948. H. HARRISON 2,455,763
INTERFEROMETRIC LIGHT VALVE
Filed March 31, 1945

HENRY HARRISON
INVENTOR

Patented Dec. 7, 1948

2,455,763

UNITED STATES PATENT OFFICE 2,455,763

INTERFEROMETRIC LIGHT VALVE

Henry Harrison, Rochester, N. Y., assignor to Eastman Kodak Company, Rochester, N. Y., a corporation of New Jersey Application March 31, 1945, Serial No. 585,957

5 Claims. (Cl. 88—61)

This invention relates to light valves. It is here described with respect to a light valve used for sound recording and also with respect to one used as a camera shutter, but is applicable to practically any of the many uses to which light valves have been put.

It is the object of the invention to provide a light valve responsive to an electric signal and capable of high speed operation with a response which is instantaneous for practical purposes.

Various other advantages are obtained in certain embodiments of the invention such as simplicity of construction and the ability to spread over an extended area i. e. to work on a wide light beam. Such advantages will not be listed separately here but will be understood from the description of the various embodiments. The invention involves two quite different but well known phenomena which give it its advantages and at the same time impose certain limitations on its use. One of these is the effect known as optical interference whereby monochromatic light is extinguished if incident onto equally reflecting surfaces spaced so that the reflecting beams are exactly out of phase. As will be pointed out certain deviations from monochromaticity and from the precise angle of incidence required to make the effective separation exactly that which gives complete interference is permissible. The second phenomenon is that of piezo electricity. This requires an electric field to be applied to a crystal and for useful effects certain crystals cut in a well-known prescribed manner should be used.

According to the invention a light valve is made of two optical surfaces, in general these are optically flat surfaces but may be slightly curved as long as they have optical quality. The surfaces are separated by less than a few, say 5, wave lengths of light since interferometers with greater separation are more critical and since the greatest deviation from optimum wave length and angle of incidence values are permissible when this separation is least. It must be of course exactly that which produces optical interference which is destructive when the valve is in the "closed" position and is different from this value when the valve is "open." A piezo-electric crystal in a variable electric field provided by any suitable means is used to support one of the surfaces and for varying the separation of the two surfaces in accordance with changes in the electric field. These changes in the separation of the two surfaces result in a change in the phase of the optical interference. One of the surfaces, hereinafter referred to as the upper surface, must transmit light to the second surface but since the practical embodiments of the invention all employ the reflected beam rather than the transmitted one at the two surfaces, the second or lower surface may be either opaque or transmitting; it must be light reflecting of course. Either surface may be supported and operated by the piezo-electric crystal but in general it is simpler to have the lower surface so supported and operated and to have the upper surface as one surface of a prism to permit convenient routing of the light path. The two surfaces constitute an interferometer. The lower surface may conveniently be that of the piezo-electric crystal itself except that such an arrangement requires a more elaborate system for applying the electric field. For example if the field is applied by the two plates one below the piezo-electric crystal and the other above the prism, the potential difference between the plates will necessarily be quite high in order to produce a useful field over the crystal itself. Thus I prefer to have a separate optical arrangement providing the lower surface of the interferometer and carried by a piezo-electric crystal whose upper electrode is in contact with the crystal itself. When the surfaces are flat perfect results are obtained only with parallel light. In a converging or diverging beam it is possible to compensate slightly for the difference in the angle of incidence of marginal and paraxial rays by curving one of the surfaces very slightly with respect to the other. This curvature gives a difference in thickness much less than a wave length of light and hence does not lend itself to direct illustration but the operation thereof is obvious.

With the above-discussed arrangements the angle of incidence is different from normal and hence the intensity of the reflected light depends on the azimuth of the polarization. That portion of the beam whose vibration axis is parallel to the reflecting surface is more highly reflected than the other component of the incident beam; at Brewster's angle the reflected beam is fully polarized.

To insure that the optical interference is not affected by these polarization effects, I prefer to include a polarizing filter in the light beam restricting it to light of one of the two principal directions of vibration with respect to the angle of incidence.

In applying this invention to sound recording, suitable means must be provided to control the electric field in accordance with the desired signal. When using the valve as a camera shutter for photographic purposes, in order to get extremely high speed action, the valve should be adjusted to have zero transmission in the absence of any electric field so that the introduction of an electric field interrupts the destructive interference and allows light to pass for the interval desired. Usually such an arrangement is used only as an auxiliary shutter, the main shutter being opened just before the electrical impulse is applied and closed just after.

The operation of the invention and its advantages will be fully understood from the following description of various embodiments and, for the benefit of these interested, of the mathematical theory involved, all when read in connection with the accompanying drawings, in which:

Fig. 1 is a vertical section of one embodiment of the invention.

Fig. 2 shows such an embodiment applied to sound recording; Fig. 2A being an elevation of part of the optical system which is shown in plan in Fig. 2.

Fig. 3 shows an embodiment of the invention used as a high speed camera shutter.

Fig. 4 shows a special embodiment of the invention designed to utilize both polarized components of the incident beam.

Figure 5:
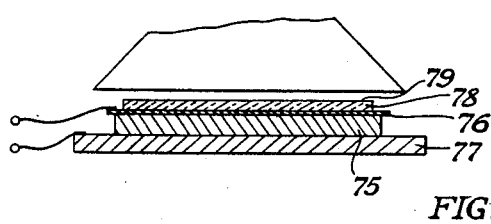
Fig. 5 and 6 illustrate slightly different embodiments of the invention.

In Fig. 1 an incident light beam 10 enters a prism 11 and is partially reflected from the hypotenuse surface 12 thereof. Immediately below the hypotenuse surface 12 and forming an optical interferometer therewith is another reflecting surface 13. When the separation of these two surfaces, with respect to the wave length of the incident light, is such that completely destructive interference is produced, no light is reflected in the direction of the arrows 15. At other values of the separation of the surfaces 12 and 13 however, there is light reflected as represented by these arrows 15. Zero adjustment of the separation of the surfaces is provided by screws 16.

The lower surface 13 is carried by a metal plate 17 which in turn is carried by a piezo-electric crystal 20. The plate 17 is bent over the edge of the crystal to permit electrical contact therewith by a conductor 21. The crystal 20 is carried on a metal base plate 22 which is also electrically connected to a source of potential by conductor 23. By applying potential either direct or alternate to conductors 21 and 23 an electric field either direct or alternate can be imposed on the piezo-electric crystal 20. Under the force of this electric field the crystal expands or contracts in a well known manner and thus varies the separation of the reflecting surfaces 12 and 13. Depending upon the material and the orientation of the crystal axis in the crystal 20, the change in separation is proportional to the electric field applied. Quartz crystals which expand along the axis of the applied electric field have rather low sensitivity lying in the neighborhood of $2 \times 10^{-10}$ cm. per volt. To modulate completely light of 400 millimicron wave length with this arrangement requires a signal of 15,000 volts peak. Thus the crystal would have to be at least about 5 mm. thick to prevent dielectric break down. Such potentials are obtainable from vacuum tube amplifiers with suitable transformers but are not convenient to use for obvious reasons.

Therefore I prefer to use Rochelle salt crystals which are among the most sensitive piezo-electric crystals known. The effect is a shear which takes place around the electric axis, but this can be resolved into an expansion normal to the field axis and a perpendicular contraction each having $1/\sqrt{2}$ times the magnitude of the shear. By tilting the expansion axis at 45° to the electric field axis half of the field is effective to produce expansion along the field axis. Thus the maximum expansion sensitivity is .35 of the maximum shear sensitivity and can be as great as $6 \times 10^{-8}$ cm. per volt. Modulation of 400 millimicrons wavelength light thus requires only 50 volts signal.

Since Rochelle salt crystals deform in this peculiar way I employ a backing for them which yields in shear namely a very thin layer of rubber cement binding the crystal 20 to its metal foundation 22.

Furthermore Rochelle salt crystals are particularly sensitive to variations in temperature. The values given above for sensitivity assume an ambient temperature of about 23° C. The piezo-electric sensitivity variations with temperature are not serious for most practical purposes since in sound recording for example the absolute sensitivity is of little importance and thermal changes can be minimized by suitable insulation and by the use of fins to dissipate any heat produced. In very critical cases some electrical compensation is made for any temperature change.

It is desirable from the above considerations to have a thin crystal. To prevent overstraining the thickness should be at least 2000 times its thickness distortion or at least .1 mm. I prefer to use about .5 mm. Thickness does not have any major effect on the sensitivity. The natural mechanical frequency of Rochelle salts is given by $$\frac{2 \times 10^5}{a}$$

where $a$ is the dimension along which oscillation takes place. All of this discussion relative to the piezo-electric crystals themselves is known to those skilled in piezo-electricity. The present invention is concerned only with the combination of such crystals and optical interference for use as a light valve, but for the sake of completeness this outline of practical considerations involved in piezo-electricity is given. Similar and further details are discussed below in connection with Fig. 2.

In Fig. 2 light from a source 25 is projected by lenses 26 and 27 onto a light valve according to the invention. A color filter 28 is interposed in the light beam to restrict the wave length to a band permitting substantially complete optical interference in the interferometer. Preferably a polarizing filter 29 is included with its vibration axis perpendicular to the plane of the drawing. The light source is shown as a point source but may have an elongated filament with its long dimension parallel to the interference plane. The filter 28 is a blue one, transmitting 400–560 millimicrons. The light emerging from the prism 27 is collimated and since the light source is effectively very small this beam can be considered as made up entirely of parallel light. The light beam enters a prism 30 and optical interference occurs between surfaces 31 and 32. This interferometer as before is operated by a piezo-electric crystal 35, the electric field for which is supplied by a source of electric signal 37 through transformer 36.

The reflected and modulated beam 40 is diverged by a lens 41 and then focused by a biconvex lens 42 and a cylindrical lens 43 to form a line of light on the sound track area of a sensitive motion picture film 44.

In the interferometer the collimated beam having entered the prism 30 substantially normally, strikes the internally reflecting flat surface at such an angle of incidence that 30 per cent is reflected, the remainder passing through to be reflected from the silvered surface 32 of a Rochelle salt crystal which is about 1 mm. thick, and is cut at 40° to its electric axis and parallel to its contraction axis. The crystal is cemented by a thin layer of plastic cement to a metal foundation plate 45. Around the crystal between the metal plate 45 and the prism 30 are glass blocks 46 polished to hold the glass flat about 3/8 of a wave length from the silvered surface.

In Fig. 3 a camera 50 is arranged with its lens focused on infinity and is provided with an auxiliary attachment 51 in front of the lens according to the present invention. This attachment comprises an achromatic lens 52 for collimating the light from the subject, a polarizing filter 53 to eliminate polarization from one azimuth as discussed above and an interferometer made up according to the invention consisting of a prism 54 and a piezo-electric crystal 55. An electrical field can be applied to the piezo electric crystal through suitable conductors 56. Normally the spacing between the prism 54 and the reflecting surface carried by the crystal 55 is adjusted to give zero reflection i. e. to give completely destructive interference. To obtain a very high speed brief shutter opening, an electrical impulse to provide a field across the crystal, is applied from a battery 60 through a brush type switch 61 and suitable conductors 62. Before operation, the pendulum part 63 of the brush switch 61 is held in the upper dotted position shown, by suitable detent or catch 64. To operate the shutter the catch 64 is withdrawn allowing the pendulum to swing down and make a brush contact with a plate 65 and to continue as a pendulum to the point shown by dotted lines 66 whereas it is held by a spring urged detent 67. The duration of the impulse is proportional to the length of time electrical contact is made.

In Fig. 4 the incident light, collimated by a lens 70 is polarized and divided into two beams polarized at right angles slightly diverging from one another, by a Wollaston prism 71. This highly refined arrangement is to obtain greater efficiency by utilizing both polarized components of the incident beam. Whenever substantially total extinction is required one cannot normally use unpolarized light since the angle of incidence for total destruction depends on the polarization of the incident light. The Wollaston prism serves to direct the two beams to the interferometer at slightly different angles of incidence and by proper orientation of the prism it is possible to select two different angles of incidence which are approximately the optimum ones for each of the planes of polarization.

Fig. 5 differs from Fig. 1 by showing a piezoelectric crystal 75 having two conducting coatings 76 and 77 the upper one of which carries a glass plate 78, preferably opaque, whose upper surface 79 acts as the rear surface of the interferometer.

Figure 6:
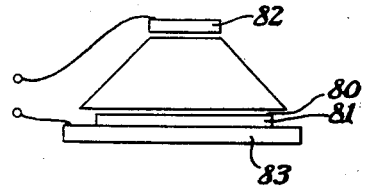

In Fig. 6 the upper surface 80 of the piezoelectric crystal 81 itself is used as the rear surface of the interferometer and the electric field is applied between two plates 82 and 83. This arrangement simplifies the construction of the interferometer but at the same time requires higher potentials on the plates.

Figure 7:
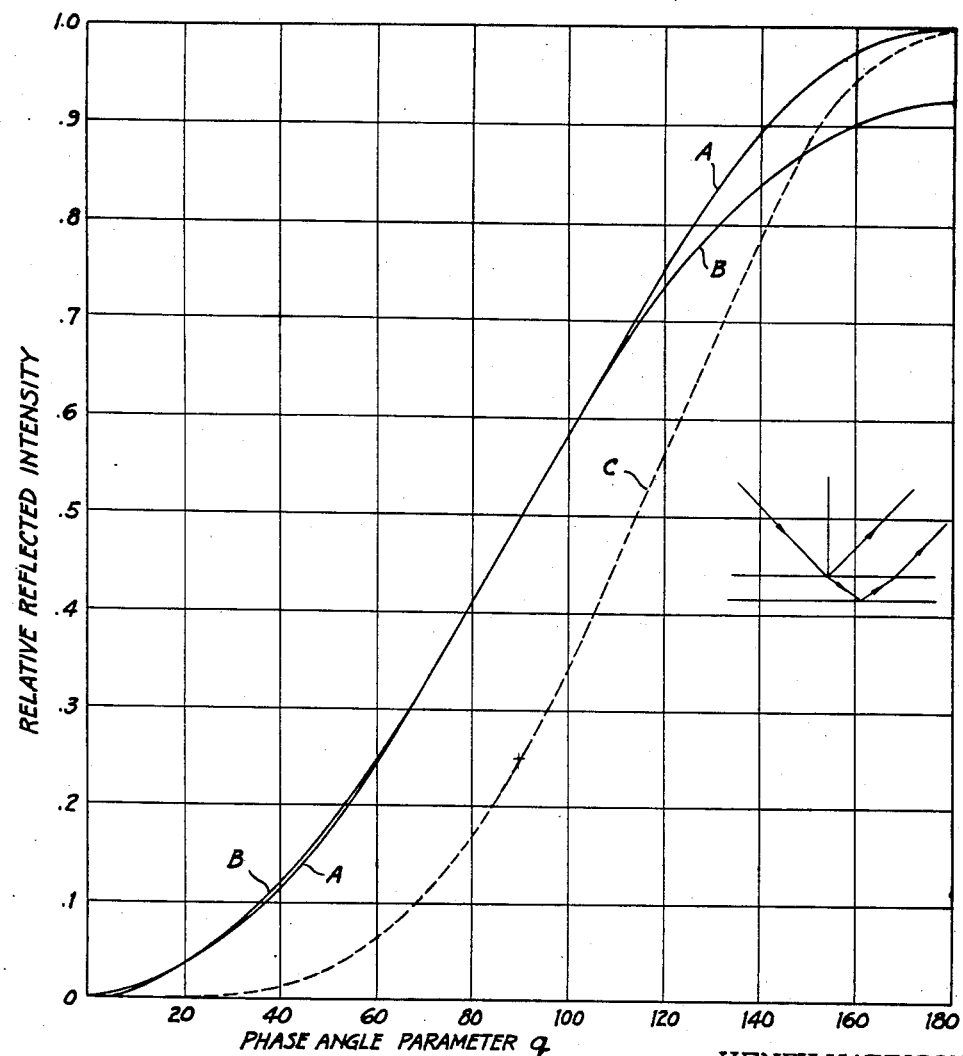
Fig. 7 is a curve of the response of a light valve according to the invention.

In order to illustrate the effect of deviations from perfect monochromaticity and deviations from the optimum angle of incidence, curves shown in Fig. 7 are included.

When collimated polarized monochromatic light is used in an interferometer, one may calculate the ratio of reflected intensity by finding the path difference between the two reflected beams. It can readily be shown that the variation of reflected intensity is given by $$I = I_0 \sin^2\left(\frac{4\pi N \cos i}{N_0 \lambda} t\right)$$

where $i$ is the angle of incidence of the beam of wave length $\lambda$ on the surface where it passes from a medium of index $N_0$ into a medium of index $N$, and $t$ is the distance from this surface to the second reflecting surface. (Hardy and Perrin, "The Principles of Optics," p. 579.)

If the beam is neither perfectly monochromated nor perfectly collimated, there will be variations in all the factors of the parameter.

$$q = \frac{4\pi N \cos i}{N_0 \lambda}$$

In order to find the effect of variations in $q$ on the functional relation between $I$ and $t$, one must make some assumption about the distribution of $I_0$ with respect to $q$. In this treatment it is assumed that $I_0$ is uniform for $q_1 \leq q \leq q_2$ and zero for all other values of $q$. Then $I$ may be integrated with respect to $q$ over this range, and the result is $$\Sigma I = I_0 \left(\frac{1}{2}(q_2 - q_1) - \frac{1}{4t}[\sin 2q_2 t - \sin 2q_1 t]\right)$$

(Peirce, "A Short Table of Integrals," #261).

These functions are plotted as curves A and B, where, in curve B, $q_2 = 1.4\ q_1$.

At this point one should note that it is possible, by making use of the dispersion of a glass prism, to keep $q$ practically constant over a fairly wide range of $\lambda$. The compensation must necessarily be in $\cos i$, since the variation with $\lambda$ of $N/N_0$ is quite small.

In curve C is plotted the transmission curve to be expected from two interferometers acting in tandem on the same beam of light. Its ordinates may be computed by squaring the ordinates of curve A. This curve gives some indication of the possibilities of this technique in shutter applications. It will be noticed that the sensitivity of the valve is approximately doubled, but its range of linearity is reduced.

From curve C one can also see that composite curves between A and C or including components from additional interferences could be used to gain a wider linear range if this should be desirable. A part of the output of the interferometer would be re-reflected from a partially silvered exit surface.

Up to this point in this mathematical analysis it has been assumed that all components of the incident beam are reflected at the two reflecting surfaces in such a way that the two emerging beams can exactly cancel. This assumption is validated below.

Both the internal glass reflection and the external metal reflection are polarizing processes. That is, except for normal incidence and total reflection, those components of the beam having their electric vector parallel to the reflecting surface are more completely reflected than the components whose electric vector is in the plane of incidence. A similar phenomenon occurs in reflection from metal surfaces, though there is in this case no angle for which the incident beam becomes completely polarized. To approach complete cancellation, one has three possible courses. Elimination of the perpendicularly polarized beam with a polarizing screen seems to be the most straightforward, though it also removes half of the beam. A second method, not quite so simple, is based on separation of the two components by a birefringent prism. Arriving at the reflecting surfaces at different incident angles, the two incident beams are both adjusted to cancel (see Fig. 4). The third obvious approach involves making the reflection at almost normal incidence, but then less than 16 per cent of the incident beam is usefully reflected unless the upper surface is partially silvered.

It is also true that the reflected intensity at the glass surface varies sharply with the angle of incidence when the per cent reflection is high. This limitation is fairly serious if one is attempting to keep $q$ constant by reflecting different colors at different angles. Even here, however, a colored metal reflecting surface can be used to equalize the reflected beams. Since no such equalization can be made to take care of the field angle of the beam, it is important that all rays of the beam be made as nearly as possible parallel to a plane. For a .4-mm. filament imaged at infinity by a lens of 5 cm. focal length, all rays are parallel to the plane of filament and collimator axes within ±.25 degrees. This is sufficiently parallel to keep minimum intensity as low as 2 per cent of the total incident intensity.

All of the difficulties enumerated in the preceding paragraphs could be avoided by using two reflecting surfaces having the same index of refraction and the same dispersion. But this makes it difficult to apply a field to the piezo-electric crystal.

The arrangement shown in Fig. 5 is one way of avoiding the latter difficulty. The opaque plate 78 tends to reduce the resonant frequency of the crystal somewhat but in general does not bring it into the audio range especially if the plate 78 is very thin. An alternative method applicable to Fig. 1 for example would be to have the conducting metal foil 17 so thin that it would be effectively transparent, but for very thin foils, the resistance increases and introduces a time lag in the application of electric field to the piezo-electric crystal which tends to defeat the whole purpose of the present invention. The third alternative is shown in Fig. 6 but this involves extremely high potentials and hence I prefer the arrangements shown in Fig. 5.

Having thus described two entirely different applications or embodiments of my invention, I wish to point out that it is not limited to the structure shown but is of the scope of the appended claims.

I claim:

1. A light valve comprising a piezo-electric crystal carrying a light reflecting surface, a transparent member having a refracting surface separated less than five wave lengths of light from said reflecting surface to provide destructive optical interference of a light beam passing through the member to the reflecting surface and being reflected from said refracting surface and said reflecting surface back through the member and means for applying an electric field to the crystal substantially perpendicular to the light reflecting surface for varying the separation of the surfaces and hence the phase of the interference.

2. A light valve according to claim 1 in which one of the surfaces has a very slight curvature concave to the other surface to compensate for differences in the angle of incidence of marginal and paraxial rays in a converging light beam.

3. A light valve according to claim 1 and for use with a light beam at an angle to the surfaces including a polarizing filter for restricting the polarization of the light to one of the two principal directions of vibration with respect to the angle of incidence.

4. A light valve comprising a two-reflecting-surface interferometer including a transparent member having a substantially flat refracting surface forming one reflecting surface being separated less than five wave lengths of light from the refracting surface to provide destructive optical interference in a light beam passing through the transparent member to the interferometer and being reflected therefrom and a piezo-electric crystal in a variable electric field behind the second reflecting surface and supporting it substantially perpendicular to the direction of the electric field for varying its distance from the refracting surface and thereby varying the phase of the interference.

5. A shutter for photographic purposes comprising a piezo-electric crystal carrying a light reflecting surface, a transparent member having a refracting surface separating less than a wave length of light from said reflecting surface producing, in one setting thereof referred to as the normal setting, substantially complete destructive optical interference of a light beam passing through the member to the reflecting surface and means for applying an off-on electric field to the piezo-electric crystal in a direction perpendicular to the reflecting surface to move the reflecting surface carried thereby from said normal setting when the field is off to a non-destructive setting when the field is on and means for controlling the length of time when said electric field is applied to the crystal.

HENRY HARRISON.

REFERENCES CITED

The following references are of record in the file of this patent:

UNITED STATES PATENTS

| Number | Name | Date |
|---|---|---|
| 1,792,766 | Schroter | Feb. 17, 1931 |

FOREIGN PATENTS

| Number | Country | Date |
|---|---|---|
| 32,939 | France | Dec. 29, 1927 |
| | (1st Addition to No. 601,732) | |
| 342,219 | Great Britain | Jan. 29, 1931 |